United States Patent
Kamo (10) Patent No.: US 10,333,205 B2
(45) Date of Patent: *Jun. 25, 2019

(54) ON-VEHICLE RADAR DEVICE AND VEHICLE

(71) Applicant: Nidec Corporation, Kyoto (JP)

(72) Inventor: Hiroyuki Kamo, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/718,041

(22) Filed: Sep. 28, 2017

(65) Prior Publication Data

US 2018/0034141 A1 Feb. 1, 2018

Related U.S. Application Data

(63) Continuation of application No. 14/798,597, filed on Jul. 14, 2015, now Pat. No. 9,799,949.

(30) Foreign Application Priority Data

Sep. 30, 2014 (JP) ................................. 2014-201870
May 14, 2015 (JP) ................................. 2015-098991

(51) Int. Cl.
*H01Q 1/32* (2006.01)
*H01Q 13/02* (2006.01)
(Continued)

(52) U.S. Cl.
CPC ........... *H01Q 1/3266* (2013.01); *G01S 7/024* (2013.01); *G01S 7/032* (2013.01); *G01S 13/02* (2013.01);
(Continued)

(58) Field of Classification Search
CPC ............... B32B 17/10036; B32B 11/00; B32B 17/10963; G01N 21/21; H04N 5/2251
(Continued)

(56) References Cited

U.S. PATENT DOCUMENTS 4,647,197 A * 3/1987 Kitaya ................. G01B 11/303
250/559.44
4,876,178 A * 10/1989 Voss .................. B32B 17/10036
205/118
(Continued)

FOREIGN PATENT DOCUMENTS

CN 204936956 U 1/2016

OTHER PUBLICATIONS

Kamo, "On-Vehicle Radar Device and Vehicle", U.S. Appl. No. 14/798,597, filed Jul. 14, 2015.

*Primary Examiner* — Tung T Vo
(74) *Attorney, Agent, or Firm* — Keating & Bennett, LLP (57) ABSTRACT

An on-vehicle radar device includes a mount and an antenna configured to transmit a transmission wave from an inner side of laminated glass, which includes an innermost glass layer, an outermost glass layer, and an intermediate resin layer, and receive a reflected wave. The antenna includes a transmitting antenna. When the mount is mounted on a bracket, the incident angle of the transmission wave on the innermost glass layer is greater than a Brewster angle on the inner surface of the innermost glass layer, and the incident angle of the transmission wave on the outermost glass layer is less than or equal to a Brewster angle between the outermost glass layer and the intermediate resin layer.

20 Claims, 5 Drawing Sheets

(51) Int. Cl.
   *H01Q 1/42*    (2006.01)
   *G01S 7/02*    (2006.01)
   *G01S 13/02*   (2006.01)
   *G01S 7/03*    (2006.01)
   *G01S 13/86*   (2006.01)
   *G01S 13/93*   (2006.01)
   *H01Q 1/12*    (2006.01)

(52) U.S. Cl.
   CPC .......... *G01S 13/867* (2013.01); *G01S 13/931* (2013.01); *H01Q 1/1271* (2013.01); *H01Q 1/3233* (2013.01); *H01Q 1/422* (2013.01); *H01Q 13/02* (2013.01); *G01S 2007/027* (2013.01); *G01S 2013/9392* (2013.01)

(58) Field of Classification Search
   USPC ......................................... 348/148
   See application file for complete search history.

(56) References Cited

U.S. PATENT DOCUMENTS

| | | | | |
|---|---|---|---|---|
| 6,259,559 | B1* | 7/2001 | Kobayashi | B32B 17/10036 359/485.02 |
| 6,327,089 | B1* | 12/2001 | Hosaki | B32B 17/10018 324/244.1 |
| 8,604,968 | B2* | 12/2013 | Alland | B60R 1/00 342/22 |
| 2003/0203145 | A1* | 10/2003 | Zanchetta | B32B 11/00 428/40.1 |
| 2004/0161569 | A1* | 8/2004 | Zanchetta | B32B 11/00 428/40.1 |
| 2008/0156414 | A1* | 7/2008 | Campfield | B32B 17/10963 156/94 |
| 2009/0059368 | A1* | 3/2009 | Kamada | B32B 17/10 359/489.01 |
| 2009/0153962 | A1* | 6/2009 | Okada | G02B 27/0101 359/485.02 |
| 2009/0201583 | A1* | 8/2009 | Kamada | B32B 17/10036 359/485.02 |
| 2010/0157426 | A1* | 6/2010 | Matsunami | B29C 55/023 359/487.06 |
| 2010/0177383 | A1* | 7/2010 | Kamada | B32B 17/10036 359/485.02 |
| 2010/0214194 | A1* | 8/2010 | Kanou | B32B 17/10036 345/4 |
| 2011/0163904 | A1* | 7/2011 | Alland | B60R 1/00 342/1 |
| 2013/0182302 | A1 | 7/2013 | Shikii et al. | |
| 2014/0029005 | A1* | 1/2014 | Fiess | G01N 21/21 356/364 |
| 2014/0118179 | A1* | 5/2014 | Alland | G01S 7/025 342/22 |
| 2014/0160284 | A1* | 6/2014 | Achenbach | H04N 5/2251 348/143 |
| 2015/0123838 | A1* | 5/2015 | Shi | G01S 7/025 342/70 |
| 2015/0166072 | A1* | 6/2015 | Powers | B60W 40/06 701/1 |
| 2016/0093944 | A1 | 3/2016 | Kamo | |
| 2017/0176196 | A1* | 6/2017 | Powers | G01C 21/3415 |
| 2017/0207513 | A1* | 7/2017 | Miyoshi | H01Q 1/1271 |

\* cited by examiner

ON-VEHICLE RADAR DEVICE AND VEHICLE

BACKGROUND OF THE INVENTION

1. Field of the Invention

The present invention relates to an on-vehicle radar device and a vehicle.

2. Description of the Related Art

Research has been conducted in recent years into areas such as collision avoidance, driving assistance, and automatic driving, utilizing technology that uses radar to detect objects around a vehicle. In the case of a car, the radar has conventionally been provided on the front nose. A high-frequency oscillator needs to be placed in the vicinity of an antenna and requires water and weather proofing measures, such as protection using a radome (i.e., a radio dome), to avoid wind and rain. Meanwhile, more sophisticated detection technology has also been developed, using both radar detection and camera images.

U.S. Pat. No. 8,604,968 proposes a radar-camera sensor in which a radar and a camera are housed in a single housing. The radar-camera sensor is mounted on the front windshield of a car forward of the rear-view mirror. The radar waves used are either vertically or horizontally polarized radio waves.

A multifunctional sensor unit disclosed as an external-field-of-vehicle recognizing apparatus in International Publication No. WO/2006/035510 also has an image capturing part and a transmission/reception part that are mounted on a single sensor mounting board. The multifunctional sensor unit is installed in the interior of the vehicle.

Radar waves are attenuated due to being reflected and absorbed by the front windshield if a radar device is placed in the interior of a vehicle. The glass shows a greater influence in the case where short-wavelength radio waves are used to improve the resolution of the radar. Also, the output of the oscillator cannot be increased because there are statutory regulations governing the output of high-frequency oscillators that are available for use with vehicles. This consequently reduces the distance that can be monitored by the radar.

SUMMARY OF THE INVENTION

Preferred embodiments of the present invention provide an on-vehicle radar device, and are able to suppress or prevent a reduction in the efficiency of radio-wave transmission and reception when the on-vehicle radar device is arranged in the interior of a vehicle.

Front windshields used in vehicles such as cars are transparent and seemingly made of a single glass plate but are, in actuality, laminated glass having a three-layer structure in which two sheets of glass are laminated on inner and outer sides of a thin resin film to ensure the safety of passengers. Conventionally, it was not recognized that the amount of reflection between the resin layer which is the second layer and the outermost glass layer is large enough to affect the performance of the radar. Instead, it was thought that sufficiently accurate results could be obtained by treating the front windshield as a single glass plate for analysis purposes, as in the case where the front windshield is viewed with visible light. Under this assumption, even if a person considered an idea of reducing reflectivity by optimizing the incident angle of radio waves on the front windshield, the person would not have discerned any advantages in adjusting the incident angle to be greater than the Brewster angle. If the incident angle exceeds the Brewster angle, reflectivity increases rapidly. Accordingly, it was reasonable to select an installation angle that is slightly smaller than the Brewster angle because the installation angle could deviate from a predetermined angle due to limited accuracy of a mounting process. The inventor of preferred embodiments of the present invention discovered that the assumption described above was incorrect and conceived that the amount of reflection occurring between the resin layer which is the second layer and the outermost glass layer is too large to ignore, and that it is necessary to suppress the amount of reflection in this area. The inventor conceived of and developed various preferred embodiments of the present invention after having discovered that the reflectivity of the three-layered glass can be reduced as a whole by making the incident angle of radio waves on the innermost glass layer of the front windshield greater than the Brewster angle.

An on-vehicle radar device according to an exemplary preferred embodiment of the present invention includes a mount configured to be mounted on a bracket that is fixed to one of an innermost glass layer of laminated glass, a rear-view mirror placed on an inner side of the innermost glass layer, and a ceiling, the laminated glass including the innermost glass layer, an outermost glass layer, and an intermediate resin layer that is sandwiched between the innermost glass layer and the outermost glass layer, and an antenna configured to transmit a transmission wave from the inner side of the innermost glass layer to an outer side of the outermost glass layer and receiving a reflected wave that enters from the outer side of the outermost glass layer to the inner side of the innermost glass layer, the transmission wave being a radio wave in a millimeter wave band.

The antenna includes a transmitting antenna configured to transmit the transmission wave. A vertical polarization component of the transmission wave relative to the laminated glass is greater than a horizontal polarization component thereof. When the mount is mounted on the bracket, an incident angle of the transmission wave on the innermost glass layer at a center of a main lobe of the transmitting antenna is greater than a Brewster angle on an inner surface of the innermost glass layer, and an incident angle of the transmission wave on the outermost glass layer at the center of the main lobe is less than or equal to a Brewster angle between the outermost glass layer and the intermediate resin layer.

Preferred embodiments of the present invention are also intended for a vehicle that includes an on-vehicle radar device.

According to preferred embodiments of the present invention, it is possible to suppress a reduction in the efficiency of radio-wave transmission and reception in an on-vehicle radar device located in the interior of a vehicle.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
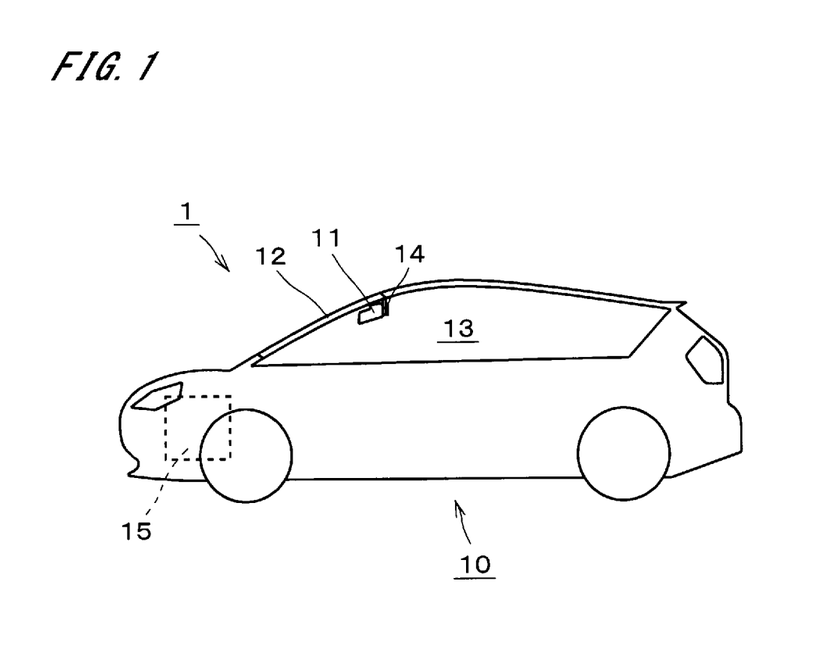
FIG. 1 is a simplified side view of a vehicle according to a preferred embodiment of the present invention.

FIG. 1 is a simplified side view of a vehicle 1 according to an exemplary preferred embodiment of the present invention. The vehicle 1 is preferably, for example, a passenger car and includes an on-vehicle radar device 11 (hereinafter, referred to as a "radar device").

The radar device 11 is used for purposes such as, for example, collision avoidance, driving assistance, and automatic driving. The radar device 11 is mounted on the inner surface of a front windshield 12 of the vehicle 1 and located in a vehicle interior 13. The vehicle interior 13 does not need to be a completely isolated space separated from the outside, and may be open-roofed, for example. The radar device 11 is located forward of a rear-view mirror 14 mounted on the front windshield 12. The vehicle 1 preferably includes a drive mechanism 15 configured to move a vehicle body 10. The drive mechanism 15 is defined by, for example, an engine, a steering mechanism, a power transmission mechanism, wheels and so on.

The front windshield 12 is fixed to the vehicle body 10 and located between the vehicle interior 13 and the vehicle exterior. The front windshield 12 is preferably made of laminated glass in which a film is sandwiched between two sheets of glass. The front windshield 12 is hereinafter also referred to as "laminated glass." The radar device 11 is fixed directly to the inner surface of the laminated glass 12 or indirectly thereto via a mounting member such as a bracket. As another preferred mounting arrangement, the radar device 11 may be mounted on the rear-view mirror or the ceiling, for example. In the present preferred embodiment, the radar device 11 preferably is indirectly fixed to the laminated glass 12 via a bracket, for example.

Figure 2:
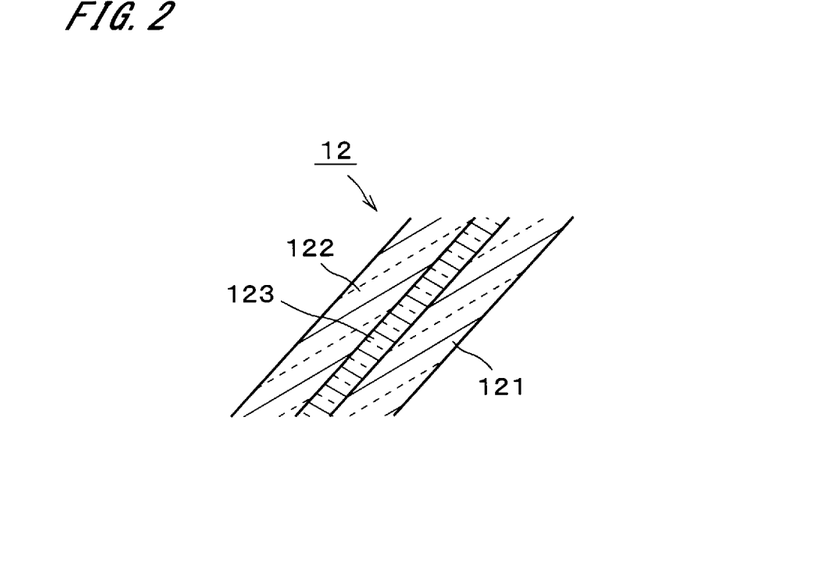
FIG. 2 is a cross-sectional view of laminated glass according to a preferred embodiment of the present invention.

As illustrated in FIG. 2, the laminated glass 12 preferably includes an innermost glass layer 121, an outermost glass layer 122, and an intermediate resin layer 123. The intermediate resin layer 123 is sandwiched between the innermost glass layer 121 and the outermost glass layer 122. That is, the innermost glass layer 121, the intermediate resin layer 123, and the outermost glass layer 122 are arranged in this order when viewed from the vehicle interior 13. The laminated glass 12 may also include other layers as long as the above three layers are included as primary constituent elements. In the present preferred embodiment, the innermost glass layer 121 and the outermost glass layer 122 are preferably made of soda-lime glass, for example. The innermost glass layer 121 and the outermost glass layer 122 may have the same optical characteristics, or may have different optical characteristics. The intermediate resin layer 123 is preferably made of polyvinyl butyral (PVB). The intermediate resin layer 123 may be made of two or more laminated resin layers.

Figure 3:
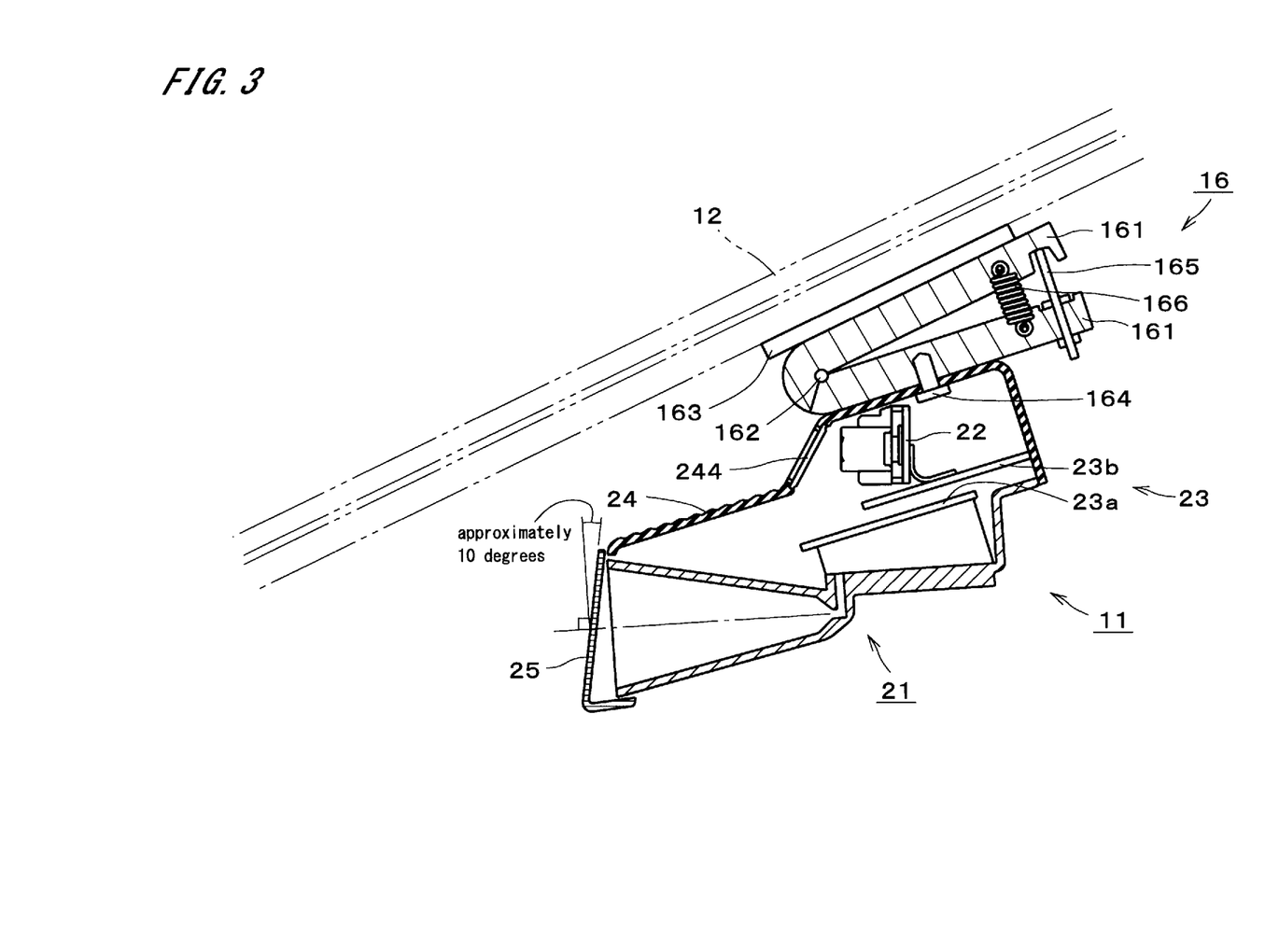
FIG. 3 is a cross-sectional view of a radar device mounted on the laminated glass according to a preferred embodiment of the present invention.

FIG. 3 is a cross-sectional view of the radar device 11 mounted on the laminated glass 12. Hatching in some of the detailed portions of the cross section have been omitted for the sake of clarity. As described previously, the radar device 11 is fixed to the laminated glass 12 via a bracket 16. The radar device 11 is freely detachable from the bracket 16.

The bracket 16 includes two plates 161 and a connecting structure 162. The two plates 161 are located, approximately overlapping with each other, and their front ends are rotatably coupled to each other by the connecting structure 162. The upper surface of the upper plate 161 is preferably firmly fixed to the laminated glass 12 with an adhesion member 163, for example. Other methods may also be used to fix the bracket 16 to the innermost glass layer 121. The lower surface of the lower plate 161 is preferably fixed to the radar device 11 with screws 164. The connecting structure 162 allows the lower plate 161 to be rotatable about an axis that extends in the right-left direction relative to the travel direction of the vehicle 1. This mechanism enables selection of the angle of the lower plate 161 relative to the upper plate 161.

The bracket 16 preferably further includes an adjusting bolt 165 and a spring 166. The spring 166 gives the two plates 161 a force acting in such a direction that the two plates approach each other. The adjusting bolt 165 determines the position of the lower plate 161 relative to the upper plate 161. The monitoring direction of the radar device 11 in the elevation direction is thus determined accurately. Instead of the adjustment mechanism of the bracket 16 in FIG. 3, other various mechanisms may be included or used. For example, a mechanism may be used in which a plurality of different types of brackets that have different angles of tilt between upper and lower surfaces are prepared, and a bracket having a suitable tilt angle is selected according to the required angle.

The radar device 11 preferably includes an antenna 21, a camera 22, a circuit 23, and a cover 24. The camera 22 is located above the antenna 21. The cover 24 covers over the antenna 21, the camera 22, and the circuit 23. The cover 24 is mounted on the antenna 21. The camera 22 is also preferably mounted on the antenna 21 via a member, which is not shown. The arrangement of the antenna 21, the camera 22, and the circuit 23 may be appropriately changed. For example, the camera 22 may be located below or beside the antenna 21. The cover 24 may cover the antenna 21, the camera 22, and the circuit 23 in various forms. For example, the cover 24 may cover the whole of the antenna 21, the camera 22, and the circuit 23, or may cover only lower portions of these structural elements.

Figure 4:
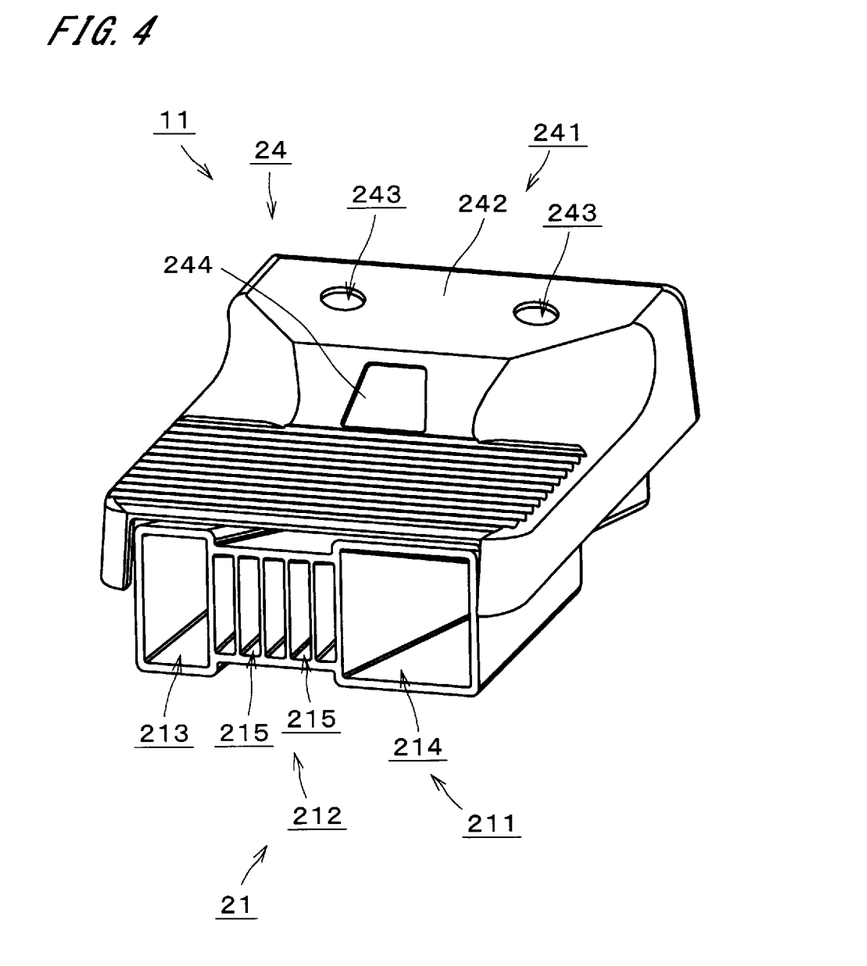
FIG. 4 is a perspective view of the radar device according to a preferred embodiment of the present invention.

FIG. 4 is a perspective view of the radar device 11. A mount 241 configured to be mounted on the bracket 16 is preferably provided on the top of the cover 24. The mount 241 preferably includes a flat surface 242 and mounting holes 243. The flat surface 242 is in contact with the lower plate 161 of the bracket 16. The screws 164 are to be inserted into the mounting holes 243.

As illustrated in FIG. 3, the circuit 23 includes a circuit board 23a configured to be mounted on the antenna 21, and a circuit board 23b to be connected to the camera 22. The circuit boards 23a and 23b are electrically connected to each other. The circuit board 23a mainly processes signals inputted from the antenna 21, and the circuit board 23b mainly processes signals inputted from the camera 22, but the distribution of these functions may be appropriately changed.

The antenna 21 transmits radio waves, which are radar waves, to the outside of the vehicle through the laminated glass 12 and receives reflected waves from the outside through the laminated glass 12. That is, the antenna 21 transmits transmission waves from the inner side of the innermost glass layer 121 to the outer side of the outermost glass layer 122 and receives reflected waves that enter from the outer side of the outermost glass layer 122 to the inner side of the innermost glass layer 121.

As illustrated in FIG. 4, the antenna 21 preferably includes a transmitting antenna 211 and a receiving antenna 212. The transmitting antenna 211 transmits transmission waves. The receiving antenna 212 receives reflected waves resulting from the transmission waves. The transmitting antenna 211 includes a first transmitting antenna 213 and a second transmitting antenna 214. The first transmitting antenna 213 and the second transmitting antenna 214 preferably are horn antennas, for example. The horns of the first transmitting antenna 213 and the second transmitting antenna 214 preferably have the same height in the elevation direction. The lateral width of the horn of the first transmitting antenna 213 is smaller than that of the horn of the second transmitting antenna 214. Thus, the first transmitting antenna 213 transmits a first transmission wave that has a wide radiation range, and the second transmitting antenna 214 transmits a second transmission wave that has a different radiation pattern from that of the first transmission wave and a narrower radiation range than that of the first transmission wave. That is, the transmitting antenna 211 is configured to transmit both the first transmission wave and the second transmission wave.

The receiving antenna 212 preferably includes five receiving antennas 215, for example. These receiving antennas 215 are arranged in the lateral direction. Each receiving antenna 215 preferably is a horn antenna. That is, every antenna included in the antenna 21 is preferably a horn antenna. The horns of the receiving antennas 215 preferably are of the same shape. Note that the "longitudinal direction" and the "lateral direction" referred to here are respectively a longitudinal direction and a lateral direction that are defined for the purpose of designing the vehicle 1, and are not necessarily exactly parallel or perpendicular to the direction of gravity.

Each horn antenna of the antenna 21 is electrically or spatially connected to a structure configured to transmit and receive signals to and from a monolithic microwave integrated circuit (MMIC), a transmission line (specifically, a microstrip line, a transducer, and a waveguide), and a horn in this order. Use of the horn antennas makes it possible to ensure a gain while suppressing the width of the antennas in the height direction, and to reduce the forward projection area of the radar device 11. It is thus possible to locate the radar device 11 in the vicinity of the front windshield without blocking the field of view of the passengers.

As illustrated in FIG. 3, the radar device 11 preferably further includes an antenna cover 25. The antenna cover 25 is not shown in FIG. 4. The antenna cover 25 is located between the laminated glass 12 and the antenna 21 and covers a front portion of the antenna 21. The antenna cover 25 is molded from a resin. The front surface, i.e., outer surface, of the antenna cover 25 is preferably black in color. This prevents the antenna 21 from standing out when viewed from the outside of the vehicle, and ensures the aesthetic appearance of the vehicle 1. The antenna cover 25 is inclined at or approximately at 10 degrees from the vertical direction relative to the direction of transmission of the transmission waves, for example.

The camera 22 preferably includes a two-dimensional image sensor. The camera 22 observes the outside from the inner side of the laminated glass 12. In other words, the camera 22 observes the vehicle exterior from the vehicle interior 13. As illustrated in FIGS. 3 and 4, the cover 24 includes a camera window 244. The camera window 244 is transparent. The camera 22 observes the vehicle exterior through the camera window 244 and the laminated glass 12.

Figure 5:
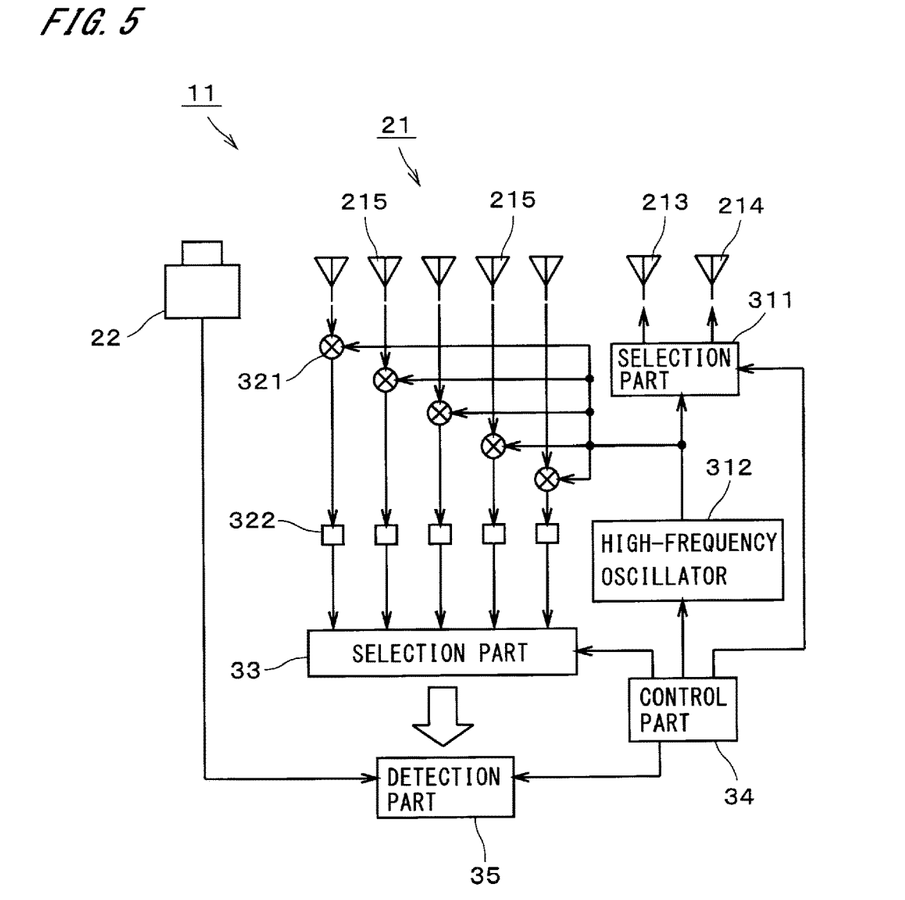
FIG. 5 is a block diagram illustrating a schematic configuration of the radar device according to a preferred embodiment of the present invention.

FIG. 5 is a block diagram illustrating a schematic configuration of the radar device 11. The first transmitting antenna 213 and the second transmitting antenna 214 are connected to a selector circuit 311. The selector circuit 311 is connected to a high-frequency oscillator 312. This enables switching between the connection of the high-frequency oscillator 312 and the first transmitting antenna 213 and the connection of the high-frequency oscillator 312 and the second transmitting antenna 214, allowing high-frequency electric power to be supplied to the first transmitting antenna 213 or the second transmitting antenna 214. That is, the transmission of the first transmission wave and the transmission of the second transmission wave is able to be switched. The present preferred embodiment preferably uses a frequency-modulated continuous wave (FMCW) system that uses a relatively narrow frequency band, and the frequency of the high-frequency signal outputted by the high-frequency oscillator 312 varies upward and downward.

Each of the five receiving antennas 215 is preferably connected to a mixer 321 and an AD converter 322 in this order. The AD converter 322 is connected to a selector circuit 33. The receiving antenna 215 receives a reflected wave that is obtained as a result of a transmission wave being reflected by an external object. A signal of the reflected wave obtained by the receiving antenna 215 and a circuit associated therewith is inputted to the mixer 321. The mixer 321 also receives input of the signal from the high-frequency oscillator 312 and combines the obtained signals to acquire a beat signal that indicates a difference in frequency between the transmission wave and the reflected wave. The beat signal is converted into a digital signal by the AD converter 322 and inputted to the selector circuit 33.

The selector circuit 33 selects at least some of the five beat signals and inputs the selected signals to a detector 35. The detector 35 obtains position, speed or the like of the object by converting the beat signals through Fourier transformation and further performing computations on the transformed signals. Meanwhile, image signals from the camera 22 are also inputted to the detector 35. Using the information received from the antenna 21 and the camera 22, the detector 35 performs more advanced detection procedures of the type and state of the object.

The selector circuit 311, the high-frequency oscillator 312, the selector circuit 33, and the detector 35 are connected to a controller 34. The controller 34 controls these constituent elements to implement the detection operation of the detector 35. The controller 34 and the detector 35 are provided in the circuit 23.

Figure 6A:
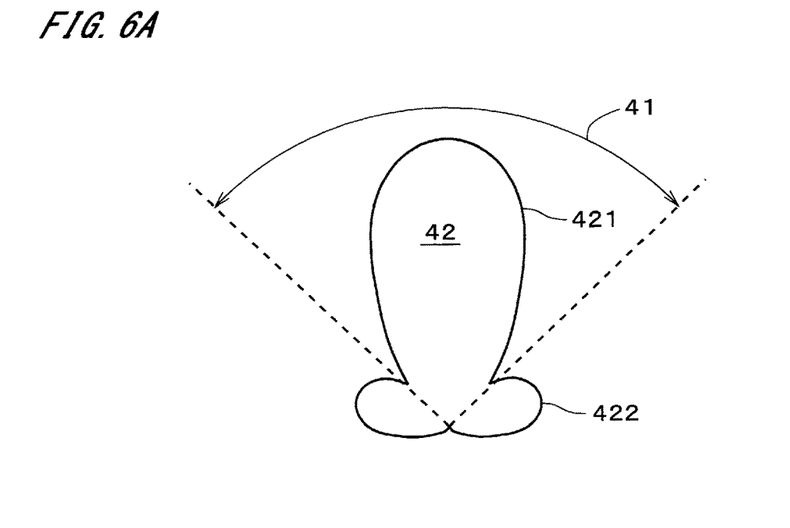
FIG. 6A illustrates a state of a near-field monitoring mode according to a preferred embodiment of the present invention.
Figure 6B:
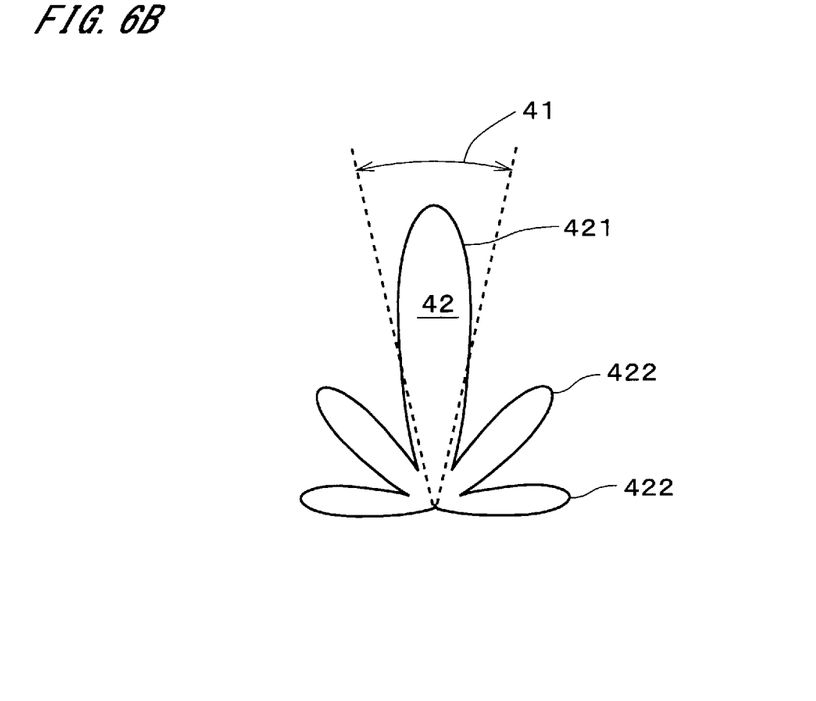
FIG. 6B illustrates a state of a far-field monitoring mode according to a preferred embodiment of the present invention.

The operation of the controller 34 includes a near-field monitoring mode and a far-field monitoring mode. FIG. 6A illustrates a state of the near-field monitoring mode, and FIG. 6B illustrates a state of the far-field monitoring mode. In FIGS. 6A and 6B, the bottom side corresponds to the antenna side, and the top side corresponds to the forward side of the vehicle 1. A range 41 indicates a radiation range of a transmission wave. The first transmitting antenna 213 and the second transmitting antenna 214 have side lobes that are sufficiently small relative to the main lobe. A pattern 42 indicates an antenna pattern of the receiving antenna 212. Reference numeral 421 indicates the main lobe, and reference numeral 422 indicates side lobes other than the main lobe 421.

In the near-field monitoring mode, the first transmission wave is transmitted from the first transmitting antenna 213 under the control of the controller 34 controlling the selector circuit 311. Meanwhile, signals derived from the five receiving antennas 215 are inputted to the detector 35 under the control of the controller 34 controlling the selector circuit 33. By using the signals from the five receiving antennas 215 arranged at narrow intervals, it is possible to enable the spread of the main lobe 421 of the receiving antenna 212 to be increased while sufficiently suppressing the spread of the side lobes 422. Thus, in the near-field monitoring mode, the azimuth resolution is lower and the effective azimuth detection range is wider than in the far-field monitoring mode, which will be described later. As described previously, the first transmission wave has a wider radiation range 41 than the second transmission wave. Thus, objects can be detected over a wide range in the near-field monitoring mode.

In the far-field monitoring mode, the second transmission wave is transmitted from the second transmitting antenna 214 under the control of the controller 34 controlling the selector circuit 311. Meanwhile, signals derived from only three of the five receiving antennas 215, namely, the leftmost, central, and rightmost receiving antennas, are inputted to the detector 35 under the control of the controller 34 controlling the selector circuit 33. By using only the signals from the three receiving antennas 215 arranged at wide intervals, it is possible the spread of the main lobe 421 of the receiving antenna 212 to be reduced. On the other hand, the spreads of the side lobes 422 increase.

However, since the second transmission wave has a narrow radiation range 41, the second transmission wave is not transmitted in the directions of the side lobes 422 as illustrated in FIG. 6B. In other words, in order to detect objects that exist far in front of the vehicle, radio waves are not transmitted in directions that deviate from the front side and do not need to be monitored. This enables detection of the reflected waves in the main lobe 421 while suppressing the influence of the side lobes 422. In the far-field monitoring mode, the azimuth resolution is high, and the effective azimuth detection range is narrow. Thus, objects that exist in the distance within a narrow range are able to be detected in the far-field monitoring mode.

As described above, the radar device 11 executes two operating modes under the control of the controller 34 controlling constituent elements including the transmitting antenna 211 and the receiving antenna 212. The radar device 11 uses a condition unique to vehicles, namely, that the receiving antenna 212 changes the range of the main lobe, and the resolution does not have to be increased across all azimuths in the far-field monitoring mode. This reduces the manufacturing cost of the radar device 11 while achieving both near- and far-field monitoring. The radar device 11 achieves adequate near- and far-field monitoring at low cost by providing a structure in which the two or more receiving antennas 215 used in the far-field monitoring mode are included in the plural receiving antennas 215 used in the near-field monitoring mode.

The antenna pattern of the receiving antenna 212 may be changed by the selector circuit 33 performing weighing on the signals from the receiving antennas 215. As another alternative, instead of using the selector circuit 33, a mechanism configured to turn on and off the actual receiving function of the receiving antennas 215 may be provided to select signals from the receiving antennas 215. In this case, the mechanism configured to turn on and off the receiving functions serves as a selector circuit.

The near-field monitoring mode and the far-field monitoring mode are switched at high speed. That is, the first transmission wave and the second transmission wave are alternately transmitted under the control of the controller 34. In actuality, in order to avoid needless transmission of radio waves during computations, a transmission stop period between the first transmission wave and the second transmission wave is longer than the transmission period of any one of the first transmission wave and the transmission period of the second transmission wave. For example, a single transmission period of a transmission wave is 2 milliseconds, and the transmission interval is about 50 milliseconds, for example.

The number of receiving antennas 215 arranged at equal intervals in the lateral direction is not limited to five. The number of receiving antennas 215 may be six or more if so desired. If the number of receiving antennas 215 is five or more, it is possible to use signals from three or more receiving antennas 215 arranged at wide intervals after the receiving antennas 215 to be used are made sparse, and to thus grasp the positions of objects that are located far away. When only one object needs to be detected, the number of receiving antennas 215 used may be two, for example. Accordingly, the minimum number of receiving antennas 215 included in the radar device 11 is three. The minimum number of selected receiving antennas 215 arranged at wide intervals is two.

If there is no need to detect the positions of objects in the near-field monitoring mode, the number of receiving antennas 215 to be used in the near-field monitoring mode may be two. For example, three receiving antennas 215 may be arranged at equal intervals, with the near-field monitoring mode using signals from adjacent two receiving antennas 215, and the far-field monitoring mode using signals from the two receiving antennas 215 at either end.

More generally, in the near-field monitoring mode, the first transmission wave is transmitted from the transmitting antenna 211, and signals from two or more narrowly spaced receiving antennas 215 among the plural receiving antennas 215 are preferably used. In the far-field monitoring mode, the second transmission wave is transmitted from the transmitting antenna 211, and signals from two or more widely spaced receiving antennas 215 among the plural receiving antennas 215 are used. To reduce the number of receiving antennas 215, at least one of the above two or more widely spaced receiving antennas 215 are included in the above two or more narrowly spaced receiving antennas.

The first and second transmission waves are vertically polarized waves relative to the lateral direction. The first and second transmission waves do not need to be exactly vertically polarized waves, and may be diagonally or elliptically polarized waves. More generally, vertical polarization components of the first and second transmission waves relative to the lateral direction are greater than the horizontal polarization components thereof. The laminated glass 12 is typically inclined such that the upper portion is located rearward of the lower portion. Thus, the vertical polarization components of the first and second transmission waves relative to the lateral direction are vertical polarization components relative to the laminated glass 12. This improves the efficiency of the transmission waves passing through the laminated glass 12. In particular, the efficiency of detection by the radar device 11 improves if the incident angles of the first and second transmission waves on the laminated glass 12 are close to the Brewster angle on the inner surface of the laminated glass 12. Note that the vertically polarized waves are also referred to as transverse magnetic waves (TM waves), and indicate polarized waves in which electric-field components are perpendicular or substantially perpendicular to the plane of reflection such that their magnetic-field components are parallel or substantially parallel to the plane of reflection. The horizontally polarized waves are also referred to as "transverse electric waves (TE waves), and indicate polarized waves in which magnetic-field components are perpendicular or substantially perpendicular to the plane of reflection. At this time, their electric-field components are parallel or substantially parallel to the plane of reflection.

In the present preferred embodiment in which the horn of the first transmitting antenna 213 and the horn of the second transmitting antenna 214 are arranged in the lateral direction, the first transmitting antenna 213 and the second transmitting antenna 214 are preferably located on both right and left sides of the receiving antenna 212. By arranging the first transmitting antenna 213, the second transmitting antenna 214, and the receiving antenna 215 side by side, plural horns can be provided in a single member. This reduces the manufacturing cost of the radar device 11. Additionally, the orientation of each horn is able to be readily and accurately determined at the time of installing the radar device 11. In particular, by arranging the horns of the first transmitting antenna 213 and the second transmitting antenna 214 in the lateral direction, it is possible to accurately match the orientation of the first transmitting antenna 213 in the elevation direction with the orientation of the second transmitting antenna 214 in the elevation direction.

The first transmitting antenna 213 and the second transmitting antenna 214 are preferably oriented so that the directions of the centers of their main lobes, i.e., the directions of the peaks of the main lobes are oriented in the horizontal direction. The first transmitting antenna 213 and the second transmitting antenna 214 may oriented so that the directions of the main lobes are oriented between the horizontal direction and a direction that is inclined at two degrees downward from the horizontal direction.

The first transmitting antenna 213, the second transmitting antenna 214, and the receiving antennas 215 may be antennas other than horn antennas, for example. They may be any type of antenna that transmits and receives millimeter waves. Examples that can be used include lens antennas, low-cost printed antennas, microstrip antennas, and slit antennas. Not every antenna included in the antenna 21 needs to be of the same type, and different types of antennas may be used together.

The following is an explanation of the orientations of the transmitting antennas with consideration given to the influence of both of the innermost glass layer 121 and the outermost glass layer 122 of the laminated glass 12. A vertically polarized wave that has entered an object at the Brewster angle is guided into the object without being reflected under the ideal condition. However, in the case of the laminated glass 12, a vertically polarized wave that has entered the innermost glass layer 121 at the Brewster angle enters the outermost glass layer 122 at an angle smaller than the Brewster angle, as will be described later. The laminated glass 12 in this case reflects the vertically polarized wave at the interface between the outermost glass layer 122 and the intermediate resin layer 123. Thus, if the incident angle of a radio wave on the innermost glass layer 121 is made slightly greater than the Brewster angle, the incident angle of the radio wave on the outermost glass layer 122 is able to be made closer to the Brewster angle. Consequently, the total reflection by the laminated glass 12 decreases due to the decrease at the interface between the outermost glass layer 122 and the intermediate resin layer 123, thus improving the efficiency of radio-wave transmission and reception.

Figure 7:
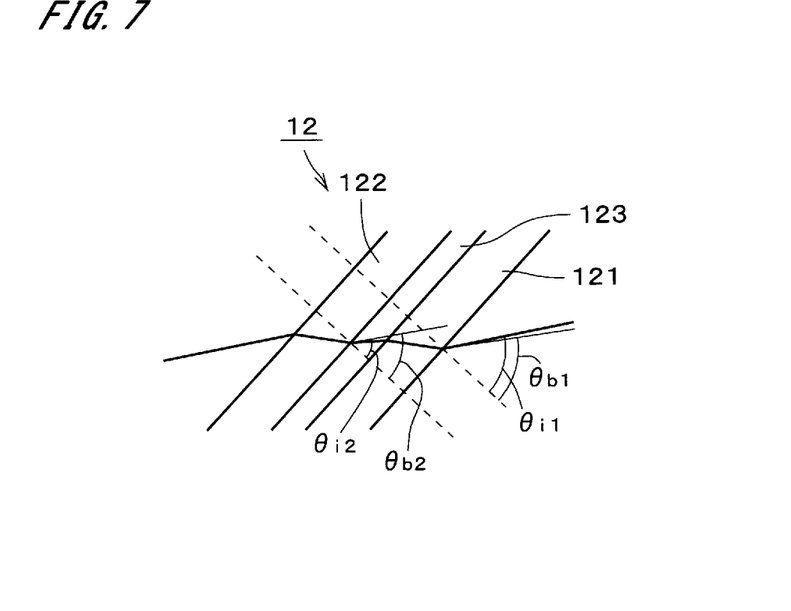
FIG. 7 illustrates how a transmission wave enters the laminated glass according to a preferred embodiment of the present invention.

FIG. 7 illustrates how a transmission wave enters the laminated glass 12. Note that the incident angle of a transmission wave indicates the incident angle of the transmission wave on an object at the center of a main lobe of a transmitting antenna, i.e., the first transmitting antenna 213 or the second transmitting antenna 214 when the mount 241 is mounted on the bracket 16.

In the following explanations, the refractive index of the air is referred to as $n_a$, the refractive index of the innermost glass layer 121 is referred to as $n_{g1}$, the refractive index of the intermediate resin layer 123 is referred to as $n_r$, the refractive index of the outer most glass layer 122 is referred to as $n_{g2}$, the incident angle of a radio wave on the innermost glass layer 121 is referred to as $\theta_{i1}$, and the incident angle of a radio wave on the outer most glass layer 122 is referred to as $\theta_{i2}$. The refractive indices $n_{g1}$ and $n_{g2}$ of the glass layers 121 and 122 are greater than the refractive index $n_r$ of the intermediate resin layer 123.

First, Formula 1 holds true according to the Snell's law.

$$n_a \sin\theta_{i1} = n_r \sin\theta_{i2} \quad \text{Formula 1}$$

Thus, if the radio wave enters the innermost glass layer 121 at the Brewster angle $\theta_{b1}$ from air space, $\sin\theta_{i2}$ can be expressed by Formula 2.

$$\sin\theta_{i2} = \frac{n_a}{n_r}\sin\theta_{b1} \quad \text{Formula 2}$$

Since $\tan\theta_{b1}$ can be expressed by Formula 3 and $\sin\theta_{b1}$ can be expressed by Formula 4 using $\tan\theta_{b1}$, $\sin\theta_{i2}$ can be expressed by Formula 5.

$$\tan\theta_{b1} = \frac{n_{g1}}{n_a} \quad \text{Formula 3}$$

$$\sin\theta_{b1} = \frac{\tan\theta_{b1}}{\sqrt{1+\tan^2\theta_{b1}}} \quad \text{Formula 4}$$

$$\sin\theta_{i2} = \frac{n_a}{n_r} \cdot \frac{\frac{n_{g1}}{n_a}}{\sqrt{1+\left(\frac{n_{g1}}{n_a}\right)^2}} \quad \text{Formula 5}$$

$$= \frac{n_{g1}}{n_r} \cdot \frac{1}{\sqrt{1+\left(\frac{n_{g1}}{n_a}\right)^2}}$$

$\tan\theta_{b2}$ can be expressed by Formula 6, where $\theta_{b2}$ is the Brewster angle when the radio wave travels from the intermediate resin layer 123 to the outermost glass layer 122.

$$\tan\theta_{b2} = \frac{n_{g2}}{n_r} \quad \text{Formula 6}$$

Thus, $\sin\theta_{b2}$ can be expressed by Formula 7.

$$\sin\theta_{b2} = \frac{n_{g2}}{n_r} \cdot \frac{1}{\sqrt{1+\left(\frac{n_{g2}}{n_r}\right)^2}} \qquad \text{Formula 7}$$

Since $n_{g1}$ and $n_{g2}$ are approximately equal to each other and $n_a$ is smaller than $n_r$, Formula 8 can be derived from a comparison of Formulas 5 and 7.

$$\sin\theta_{b2} > \sin\theta_{i2} \qquad \text{Formula 8}$$

That is, the radio wave that enters the innermost glass layer 121 at the Brewster angle $\theta_{b1}$ enters the outermost glass layer 122 at an angle smaller than the Brewster angle $\theta_{b2}$. Accordingly, it is possible to cause a radio wave to enter the innermost glass layer 121 at an incident angle greater than the Brewster angle $\theta_{b1}$ and to enter the outermost glass layer 122 at an incident angle smaller than the Brewster angle $\theta_{b2}$.

Using the above-described phenomenon occurring in the laminated glass 12, the radar device 11 is designed such that when the mount 241 is mounted on the bracket 16, the incident angle of the first transmission wave on the innermost glass layer 121 at the center of the main lobe of the first transmitting antenna 213 is greater than the Brewster angle $\theta_{b1}$ on the inner surface of the innermost glass layer 121, and the incident angle of the first transmission wave on the outermost glass layer 122 at the center of the main lobe is less than or equal to the Brewster angle $\theta_{b2}$ between the outermost glass layer 122 and the intermediate resin layer 123.

Similarly, when the mount 241 is mounted on the bracket 16, the incident angle of the second transmission wave on the innermost glass layer 121 at the center of the main lobe of the second transmitting antenna 214 is designed to be greater than the Brewster angle $\theta_{b1}$ on the inner surface of the innermost glass layer 121, and the incident angle of the second transmission wave on the outermost glass layer 122 at the center of the main lobe is designed to be less than or equal to the Brewster angle $\theta_{b2}$ between the outermost glass layer 122 and the intermediate resin layer 123.

It is, however, noted that setting too high a value for the incident angle of the first and second transmission waves on the innermost glass layer 121 is not preferable because the reflectivity increases exponentially when the incident angle is greater than the Brewster angle. Thus, the difference between the Brewster angle and the incident angles of the first and second transmission waves on the innermost glass layer 121 at the centers of the main lobes of the first transmitting antenna 213 and the second transmitting antenna 214 is preferably about 25% or less of the difference between 90 degrees and the Brewster angle, for example. This condition may be applied to only one of the first transmitting antenna 213 and the second transmitting antenna 214.

Note that the refractive indices for radio waves in the millimeter wave band have to be used when evaluating the above formulas since the refractive indices are significantly different from those at another wave band, which the inventor of the present invention observed at the wave band. The radio waves in the millimeter wave band referred to here are radio waves that have wavelengths of about 1 mm to about 10 mm in air, for example.

The radar device 11 and the vehicle 1 can be modified in various ways.

For example, the transmitting antenna and the receiving antenna may be the same antenna. Alternatively, a single transmitting antenna that is provided with a mechanism configured to change the antenna pattern may transmit both of the first transmission wave and the second transmission wave. As another alternative, a single receiving antenna that is provided with a mechanism configured to change the receiving antenna pattern may achieve both of the near-field monitoring mode and the far-field monitoring mode. In other words, the number of antennas included in the antenna 21 may be one, and the antenna 21 includes at least one antenna. It is, of course, preferable for the antenna 21 to include plural antennas.

The plural receiving antennas 215 may include antennas that are arranged in the longitudinal direction, as long as they include antennas that are arranged in the lateral direction. For example, the plural receiving antennas 215 may be arranged two dimensionally.

The object on which the radar device 11 is mounted is not limited to the front windshield. The radar device 11 may be mounted on the rear windshield for rearward monitoring. The position to mount the radar device 11 is not limited to positions on glass.

The vehicle 1 is not limited to a passenger car and may be other vehicles for use in various applications, such as, for example, a truck, a train, a plane, a boat, etc. In addition, the vehicle 1 is not limited to a man-driven vehicle, and may be an unattended vehicle such as an automated guided vehicle used in a factory.

The configurations of the above-described preferred embodiments and variations may be appropriately combined as long as there are no mutual inconsistencies.

While preferred embodiments of the present invention have been shown and described in detail, the foregoing description is in all aspects illustrative and not restrictive. It is therefore to be understood that numerous modifications and variations can be devised without departing from the scope of the invention.

This application claims priority benefit under 35 U.S.C. Section 119 of Japanese Patent Application No. 2014-201870 filed in the Japan Patent Office on Sep. 30, 2014 and Japanese Patent Application No. 2015-098991 filed in the Japan Patent Office on May 14, 2015, the entire disclosures of which are incorporated herein by reference.

The radar devices according to various preferred embodiments of the present invention are able to be installed in vehicles for use in various applications.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An on-vehicle radar device comprising:
    a mount configured to be mounted on a bracket that is fixed to one of an innermost glass layer of laminated glass, a rear-view mirror placed on an inner side of the innermost glass layer, and a ceiling, the laminated glass including the innermost glass layer, an outermost glass layer, and an intermediate resin layer that is sandwiched between the innermost glass layer and the outermost glass layer;
    an antenna configured to transmit a transmission wave from the inner side of the innermost glass layer to an outer side of the outermost glass layer and to receive a reflected wave that enters from the outer side of the outermost glass layer to the inner side of the innermost glass layer, the transmission wave being a radio wave in a millimeter wave band; wherein the antenna includes at least a first transmitting antenna and a second transmitting antenna both configured to transmit the transmission wave;

a vertical polarization component of the transmission wave relative to the laminated glass is greater than a horizontal polarization component thereof;

a radiation range of the first transmitting antenna in a horizontal direction is wider than that of the second transmitting antenna in the horizontal direction;

when the mount is mounted on the bracket, an incident angle of a second transmission wave on the innermost glass layer at a center of a main lobe of the second transmitting antenna is greater than a Brewster angle on an inner surface of the innermost glass layer, and an incident angle of the second transmission wave on the outermost glass layer at the center of the main lobe is less than or equal to a Brewster angle between the outermost glass layer and the intermediate resin layer.

2. The on-vehicle radar device of claim 1, wherein a difference between the Brewster angle and the incident angle of the transmission wave on the innermost glass layer at the center of the main lobe of the transmitting antenna is less than or equal to about 25% of a difference between 90 degrees and the Brewster angle.

3. The on-vehicle radar device of claim 1, further comprising:
a selector circuit to which the first transmitting antenna and the second transmitting antenna are connected;
a high-frequency oscillator to which the selector circuit is connected; and
a controller controlling the selector circuit.

4. The on-vehicle radar device of claim 2, further comprising:
a selector circuit to which the first transmitting antenna and the second transmitting antenna are connected;
a high-frequency oscillator to which the selector circuit is connected; and
a controller controlling the selector circuit.

5. The on-vehicle radar device of claim 1, wherein when the mount is mounted on the bracket, an incident angle of a first transmission wave on the innermost glass layer at a center of a main lobe of the first transmitting antenna is greater than the Brewster angle on the inner surface of the innermost glass layer, and an incident angle of the first transmission wave on the outermost glass layer at the center of the main lobe is less than or equal to the Brewster angle between the outermost glass layer and the intermediate resin layer.

6. The on-vehicle radar device of claim 2, wherein when the mount is mounted on the bracket, an incident angle of a first transmission wave on the innermost glass layer at a center of a main lobe of the first transmitting antenna is greater than the Brewster angle on the inner surface of the innermost glass layer, and an incident angle of the first transmission wave on the outermost glass layer at the center of the main lobe is less than or equal to the Brewster angle between the outermost glass layer and the intermediate resin layer.

7. The on-vehicle radar device of claim 3, wherein when the mount is mounted on the bracket, an incident angle of a first transmission wave on the innermost glass layer at a center of a main lobe of the first transmitting antenna is greater than the Brewster angle on the inner surface of the innermost glass layer, and an incident angle of the first transmission wave on the outermost glass layer at the center of the main lobe is less than or equal to the Brewster angle between the outermost glass layer and the intermediate resin layer.

8. The on-vehicle radar device of claim 4, wherein when the mount is mounted on the bracket, an incident angle of a first transmission wave on the innermost glass layer at a center of a main lobe of the first transmitting antenna is greater than the Brewster angle on the inner surface of the innermost glass layer, and an incident angle of the first transmission wave on the outermost glass layer at the center of the main lobe is less than or equal to the Brewster angle between the outermost glass layer and the intermediate resin layer.

9. The on-vehicle radar device according to claim 1, wherein
the intermediate resin layer is made of two or more laminated resin layers including a layer made of polyvinyl butyral.

10. The on-vehicle radar device according to claim 2, wherein
the intermediate resin layer is made of two or more laminated resin layers including a layer made of polyvinyl butyral.

11. The on-vehicle radar device according to claim 1, further comprising:
a camera configured to observe an outside from an inner side of the laminated glass; and
a cover that is configured to cover the antenna and the camera;
wherein
the cover includes the mount on a top thereof.

12. The on-vehicle radar device according to claim 2, further comprising:
a camera configured to observe an outside from an inner side of the laminated glass; and
a cover that is configured to cover the antenna and the camera;
wherein
the cover includes the mount on a top thereof.

13. The on-vehicle radar device according to claim 3, further comprising:
a camera configured to observe an outside from an inner side of the laminated glass; and
a cover that is configured to cover the antenna and the camera.

14. The on-vehicle radar device according to claim 4, further comprising:
a camera configured to observe an outside from an inner side of the laminated glass; and
a cover that is configured to cover the antenna and the camera.

15. The on-vehicle radar device according to claim 5, further comprising:
a camera configured to observe an outside from an inner side of the laminated glass; and
a cover that is configured to cover the antenna and the camera;
wherein
the cover includes the mount on a top thereof.

16. The on-vehicle radar device according to claim 6, further comprising:
a camera configured to observe an outside from an inner side of the laminated glass; and
a cover that is configured to cover the antenna and the camera;

wherein
   the cover includes the mount on a top thereof.
   17. The on-vehicle radar device according to claim 7, further comprising:
   a camera configured to observe an outside from an inner side of the laminated glass; and
   a cover that is configured to cover the antenna and the camera;
wherein
   the cover includes the mount on a top thereof.
   18. The on-vehicle radar device according to claim 8, further comprising:
   a camera configured to observe an outside from an inner side of the laminated glass; and
   a cover that is configured to cover the antenna and the camera;
wherein
   the cover includes the mount on a top thereof.
   19. The on-vehicle radar device according to claim 9, further comprising:
   a camera configured to observe an outside from an inner side of the laminated glass; and
   a cover that is configured to cover the antenna and the camera.
   20. The on-vehicle radar device according to claim 10, further comprising:
   a camera configured to observe an outside from an inner side of the laminated glass; and
   a cover that is configured to cover the antenna and the camera.

* * * * *